April 24, 1934.  L. C. DOANE  1,956,375
INDIRECT LIGHTING FIXTURE
Filed Feb. 10, 1932   2 Sheets-Sheet 1
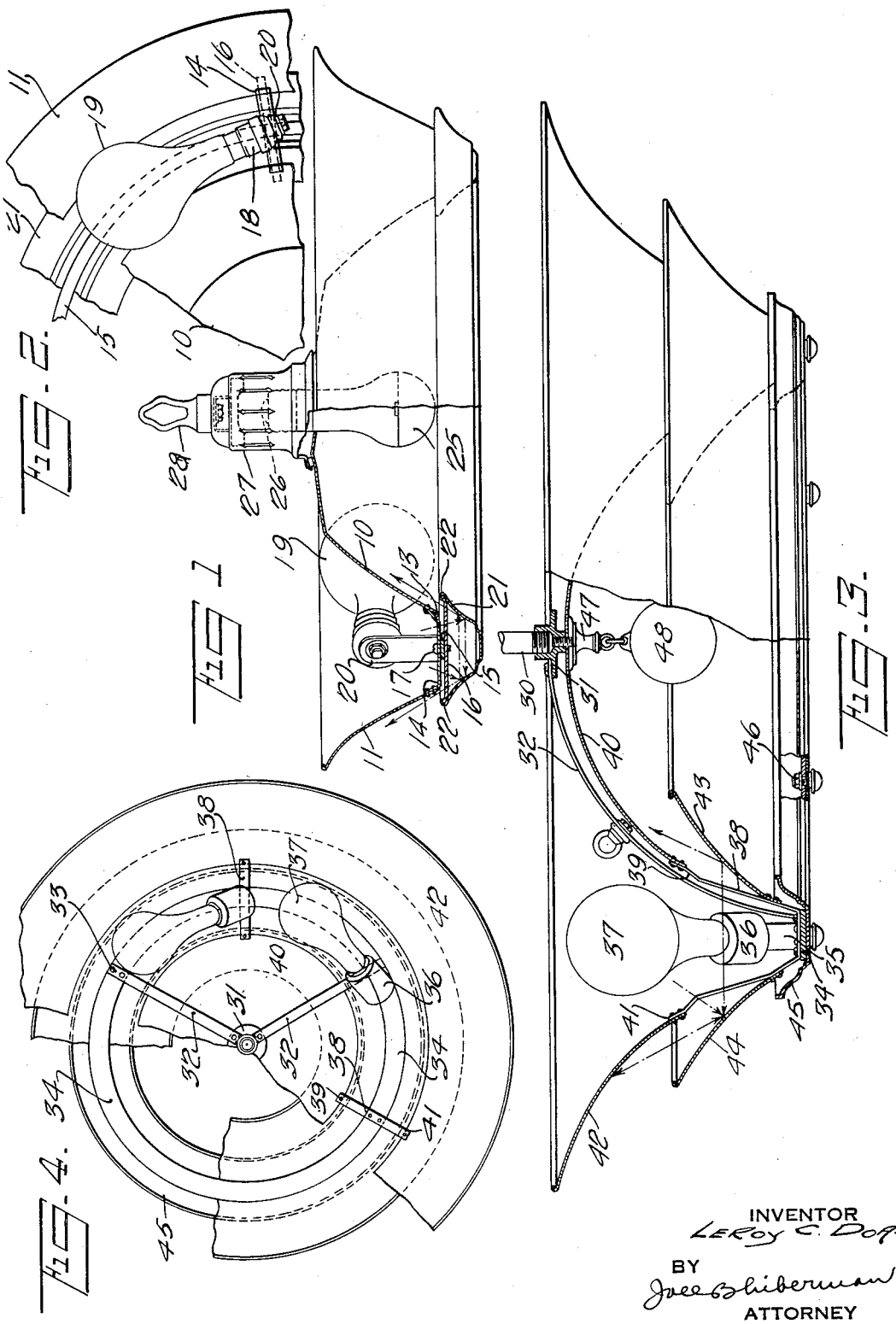
INVENTOR
LeRoy C. Doane
BY
Joee Shiberman
ATTORNEY April 24, 1934. L. C. DOANE 1,956,375
INDIRECT LIGHTING FIXTURE
Filed Feb. 10, 1932 2 Sheets-Sheet 2
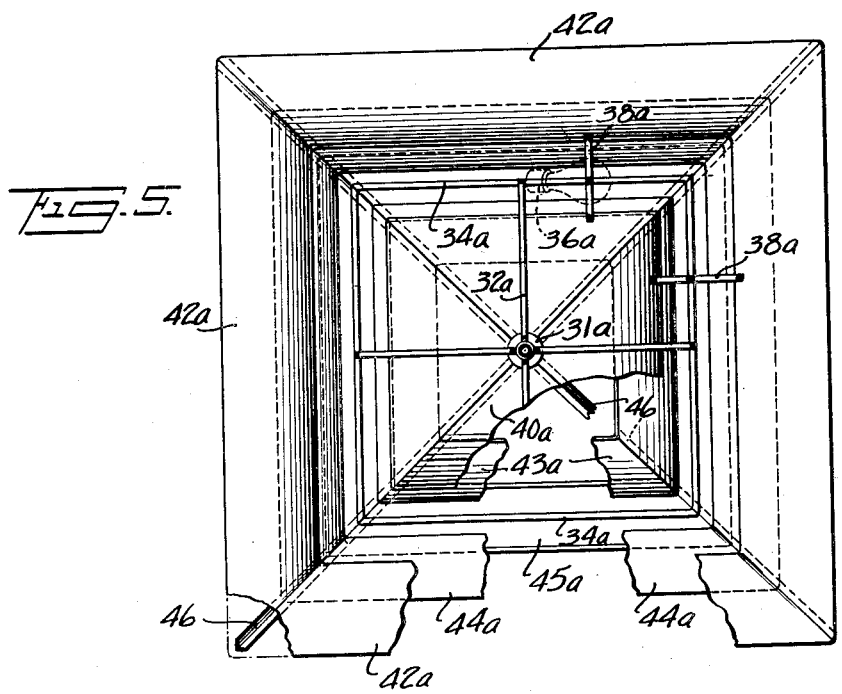
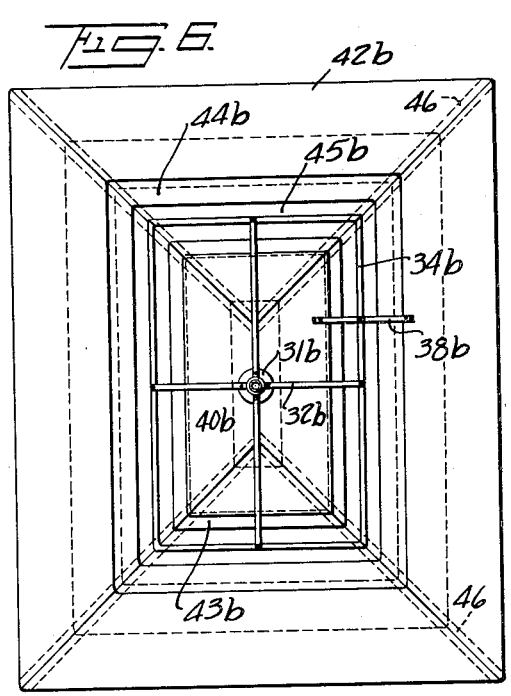 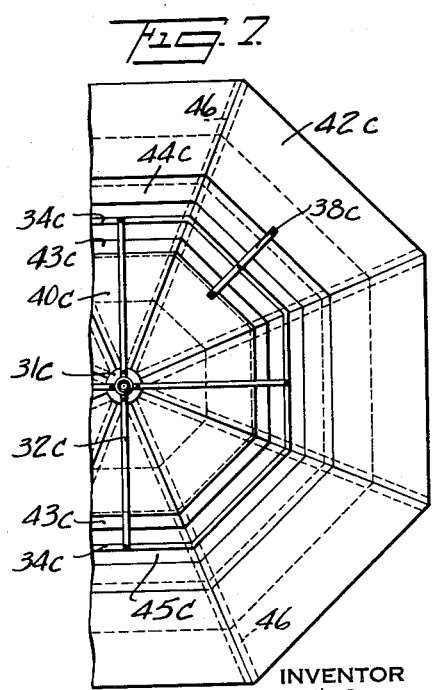
INVENTOR
Leroy C. Doane
BY
Joel B. Lieberman
ATTORNEY Patented Apr. 24, 1934

1,956,375

UNITED STATES PATENT OFFICE 1,956,375

INDIRECT LIGHTING FIXTURE

Leroy C. Doane, Meriden, Conn., assignor to The Miller Company, Meriden, Conn., a corporation of Connecticut Application February 10, 1932, Serial No. 591,943

16 Claims. (Cl. 240—78)

The present invention relates to lighting fixtures, and is more particularly directed toward indirect lighting fixtures of a type adapted to employ a plurality of incandescent lamps.

The present invention contemplates an indirect lighting fixture wherein a number of incandescent lamps are carried above a horizontal trough of annular or other closed shape which deflects light upwardly toward the ceiling and screens the lamps against direct vision at ordinary angles. The trough may be made of metal or of translucent material and is open at the bottom to allow a small amount of light to escape downwardly where it is intercepted by a second trough which redirects it upwardly to illuminate the outer surfaces of the upper trough. In fixtures of larger sizes, a second supplemental trough may be provided below the first supplemental trough for illuminating its exterior. The fixture may also be provided with a centrally disposed light source below the inner trough forming part for producing direct lighting as modified by the shape of this trough forming part and screened by it for some distance below the horizontal.

The accompanying drawings show, for purposes of illustrating the present invention, several embodiments in which the invention may take form, it being understood that the drawings are illustrative of the invention rather than limiting the same. In these drawings:

Fig. 1 is a sectional view with parts in elevation showing a form of lighting fixture adapted for both direct and indirect lighting;

Fig. 2 is a fragmentary top plan view of the fixture of Fig. 1;

Fig. 3 is a vertical sectional view of a multiple louver indirect lighting fixture with parts in elevation;

Fig. 4 is a top plan view of an annular fixture of the form shown in Fig. 3 with parts broken away; and Figs. 5, 6, and 7 are top plan views, illustrating fixtures with closed troughs of square, rectangular, and octagonal shape, respectively.

In the form shown in Figs. 1 and 2, the body of the fixture is provided with two sheet metal stampings or spinnings 10 and 11. The inner or central part 10 is concave from underneath with rather deeply drawn outer portions 12 stiffened by a bead 13 if desired. The outer part 11 is in the form of a band sloping upwardly and outwardly and of substantially larger diameter than the inner part and forming an annular trough adapted to receive lamp bulbs.

The stampings or spinnings 10 and 11 are connected by bridging members 14 in the form of narrow straps. These straps are shown as being secured to a flat narrow ring 15 extending about the fixture, and to lower straps 16. Screws 17 may be used to fasten these parts together. The sockets 18 for the lamp bulbs 19 are secured to the ring 15 by uprights 20 so as to support the lamp bulbs in the trough. The straps 16 are provided to support a supplemental trough 21 of annular shape and made preferably of sheet metal. Its edges are rolled toward one another as indicated at 22 so that the ends of the straps 16 may engage the same. These straps may be turned about the screws 17 to release the trough 21. The trough 10—11 allows light to escape upwardly and deflects light upwardly for indirect illumination. Some light from the lamp bulbs 19 passes downwardly through the opening 23 between the trough forming parts and is reflected upwardly as indicated to illuminate the exposed or lower surfaces of the parts 10 and 11 so that the fixture presents an attractive appearance.

It will, of course, be understood that the trough forming parts may be made of translucent material such as fabric, parchment, or glass held in suitable frames, that the arrangement shown for holding the parts together may be varied to suit conditions, and that the fixture shape may be square, rectangular, elliptical, etc.

The central stamping or spinning 10 may be shaped to provide a reflector for a centrally located lamp bulb 25 as indicated. This bulb may be carried in a socket 26 secured in a socket cover 27 carried by the upper side of the part 10 and the entire fixture hung by a loop 28. The lamp bulb 25 may be an ultra-violet lamp, such as the S2 lamp, where ultra-violet radiation is desired, or it may be an ordinary incandescent lamp with or without a reflecting tip. The socket height will be adjusted so that the light source is suitably shielded by the fixture body.

Where it is desired to make a fixture of the type shown in Figs. 1 and 2 for indirect lighting only, the central lamp bulb will be omitted and the stamping 10 may be provided with a suitable ornamental shape.

In the form shown in Figs. 3 and 4, the fixture is supported from a pipe or other support 30 connected into a central flanged member 31. A number of straps 32 extend radially from the center of the fixture and are bent downwardly as appears in Fig. 3. The lower ends 33 of these straps are secured to a ring 34. A number of socket supporting straps 35 are secured to this ring and are adapted to hold sockets 36 and lamp bulbs 37 in place. The ring 34 also carries a number of U-shaped bridging members 38 secured to it by screws or rivets as desired. The upper inner ends 39 of these U-shaped members are secured to an upwardly dished stamping 40, while their upper outer ends 41 are secured to an annular band 42. The intermediate portions of the U-shaped straps 38 are secured to annular bands 43 and 44 as indicated. The stampings 40 and 42 form an upper lamp receiving trough adapted to deflect light upwardly as will be understood. The opening between the edges of the stampings 40 and 42 permits light to escape downwardly where it strikes the upper surface of the stampings 43 and 44 as indicated. It is reflected upwardly to illuminate the lower concave surfaces of the parts 40 and 42. The lower edges of the parts 43 and 44 are spaced apart so that some light escapes downwardly to fall on a second supplemental screen 45 which reflects the light upwardly and outwardly to illuminate the concave lower surfaces of the parts 43 and 44. This supplemental screen may be secured in place by bolts as indicated at 46. To make the fixture more rigid, the central part of the stamping 40 may be secured to the member 31 as indicated at 47. A glass ball 48 may be added to improve the ornamental appearance of the fixture.

Figs. 5, 6, and 7 are top plan views of fixtures having continuous troughs of other than annular shape but designed to have the same cross section as shown in Fig. 3. The deflectors 40a, 40b, and 40c, 42a, 42b, and 42c, 43a, 43b, and 43c, 44a, 44b, and 44c, and 45a, 45b, and 45c, may be made cut of straight strips of sheet metal rolled or shaped to the desired contour, and cut with mitred ends to the proper size. These trough-forming parts are secured to rings 34a, 34b, or 34c by U-shaped straps 38a, 38b, or 38c, as above described. The corners formed by joining the sheet metal strips may be finished by suitable corner members 46, if desired. The rings 34a, 34b, or 34c may support lamp sockets of the usual type for ordinary incandescent lamps, or for tubular lamps, or other forms of light sources may be used.

These fixtures operate in substantially the same manner as the fixture previously described but are adapted to be made in larger sizes.

The number of supplemental screens may be increased where more louvers or light openings are desired.

It will, of course, be understood that the parts 40, 42, 43, and 44 of Figs. 3 and 4, and corresponding parts of Figs. 5, 6, and 7, may be made of translucent material and the parts 34 and 45 and similar parts may be united in single castings. Where one desires a central opening through the fixture, the part 40 may be provided with a large central opening, and the fixture supporting devices may pass through this opening and extend down underneath the parts 40, 43, and 45, the trough being supported from underneath instead of by concealed straps, as shown in the drawings.

It is obvious that the invention may be embodied in many forms and constructions, and I wish it to be understood that the particular forms shown are but a few of the many forms. Various modifications and changes being possible, I do not otherwise limit myself in any way with respect thereto.

What is claimed is:

1. An indirect lighting fixture having a plurality of light sources disposed in a substantially horizontal plane and spaced about a vertical axis, a horizontal, open-bottomed, light-source-receiving trough which in plan presents a closed figure about said vertical axis, the trough walls being adapted to upwardly deflect light from the light sources and screen them in generally horizontal directions, and a supplemental trough of similar shape below the light-source-receiving trough and receiving light through the open bottom thereof and reflecting it onto the lower surfaces of the first trough forming parts to illuminate such surfaces.

2. An indirect lighting fixture as in claim 1 wherein said troughs are annular and formed with surfaces of revolution about said vertical axis.

3. An indirect lighting fixture as in claim 1 having bridging members extending between the lower edges of the first trough forming parts for holding them in spaced relationship.

4. An indirect lighting fixture as in claim 1 having bridging members extending between the lower edges of the first trough forming parts and a narrow socket supporting ring secured to the bridging members.

5. An indirect lighting fixture as in claim 1 having bridging members extending between the lower edges of the first trough forming parts, and means for supporting the supplemental trough from the bridging members.

6. An indirect lighting fixture as in claim 1 having bridging members extending between the lower edges of the first trough forming parts, a narrow socket supporting ring secured to the bridging members, and means for supporting the supplemental trough from the bridging members.

7. An indirect lighting fixture having a plurality of light sources disposed in a substantially horizontal plane and spaced about a vertical axis, a horizontal, open-bottomed, light-source-receiving trough which in plan presents a closed figure about said vertical axis, the trough walls being adapted to upwardly deflect light from the light sources and screen them in generally horizontal directions, a supplemental trough of similar shape below the light-source-receiving trough and receiving light through the open bottom thereof and reflecting it onto the lower surfaces of the first trough forming parts to illuminate such surfaces, the supplemental trough being closed at its bottom, bridging members extending between the lower edges of the first trough forming parts, and short straps carried below the bridging members and supporting the supplemental trough.

8. An indirect lighting fixture as in claim 7 characterized in that the supplemental trough is made of sheet metal and has inturned edges and in that the ends of the straps are received within said inturned edges.

9. An indirect lighting fixture having a plurality of light sources disposed in a substantially horizontal plane and spaced about a vertical axis, a horizontal, open-bottomed, light-source-receiving trough which in plan presents a closed figure about said vertical axis, the trough walls being adapted to upwardly deflect light from the light source and screen them in generally horizontal directions, a supplemental trough of similar shape below the light-source-receiving trough and receiving light through the open bottom thereof and reflecting it onto the lower surfaces of the first trough forming parts to illuminate such surfaces, the supplemental trough being formed of two members whose lower edges are spaced apart a lesser distance than the spacing of the edges of the first trough forming parts, and a second supplemental trough below the first trough and acting to receive light through the open bottom thereof and reflect it onto the lower surfaces of the members forming the first supplemental trough.

10. An indirect lighting fixture as in claim 9 having U-shaped bridging members extending between the lower edges of the first trough forming parts and secured to the lower edges of the members forming the first supplemental trough.

11. An indirect lighting fixture as in claim 9 having a reinforcing ring secured to the second supplemental trough, socket supports carried by said ring, and U-shaped straps secured to the ring and to the edges of the members forming the two upper troughs.

12. An indirect lighting fixture comprising a plurality of lamp sockets spaced about a vertical axis, lamp bulbs in the sockets, an outer upwardly and outwardly flaring opaque band outside the bulbs, a central opaque member having a depending outer portion which, together with the band, form a lamp bulb receiving trough of closed configuration and open at the bottom, a supplemental trough spaced below the lamp receiving trough, the supplemental trough receiving downwardly emitted light from the lamp bulbs and reflecting it upwardly for illuminating the outer surfaces of the band and central opaque member.

13. An indirect lighting fixture comprising a supporting ring, sockets mounted above the ring and adapted to carry lamp bulbs, an outer upwardly and outwardly flaring opaque band secured to the ring, an inner central opaque member secured to the ring, the central member having a depending outer portion which, together with the band, form a lamp bulb receiving trough of closed configuration and open at the bottom, and a supplemental trough supported from the ring, the supplemental trough receiving downwardly emitted light from the lamp bulbs and reflecting it upwardly for illuminating the outer surfaces of the band and central opaque member.

14. An indirect lighting fixture comprising a central sheet metal member dished upwardly to have downwardly and outwardly flaring edge portions concave from underneath, an outer annular sheet metal band sloping downwardly and inwardly and concave from underneath, its lower edge being at substantially the same elevation as the lower edge of the central member and being spaced therefrom to form a lamp receiving trough, U-shaped straps secured to the edges of the trough forming members, a ring secured to the bottoms of the U-shaped straps, sockets carried by the ring and adapted to support lamp bulbs between the sides of the trough, and annular opaque screening members carried by the straps for screening off light passing downwardly between the trough forming members and reflecting this light onto the outer concave surfaces of the trough forming members.

15. An indirect lighting fixture comprising a central sheet metal member dished upwardly to have downwardly and outwardly flaring edge portions concave from underneath, an outer annular sheet metal band sloping downwardly and inwardly and concave from underneath, its lower edge being at substantially the same elevation as the lower edge of the central member and being spaced therefrom to form a lamp receiving trough, U-shaped straps secured to the edges of the trough forming members, a ring secured to the bottoms of the U-shaped straps, sockets carried by the ring and adapted to support lamp bulbs between the sides of the trough, annular opaque screening members carried by the straps for screening off light passing downwardly between the trough forming members and reflecting this light onto the outer concave surfaces of the trough forming members, and ring supporting bars extending upwardly and inwardly from the ring and concealed by the inner screening member and central member.

16. A lighting fixture for direct and indirect lighting comprising a plurality of lamp sockets spaced a uniform distance from a vertical axis, lamp bulbs in the sockets, an annular lamp bulb receiving trough formed of two opaque parts whose surfaces are substantially surfaces of revolution about the axis and adapted to upwardly deflect light from the lamp bulbs for indirect lighting and screen them in generally horizontal directions, a supplemental annular trough below the lamp receiving trough and receiving light through the open bottom thereof and reflecting it onto the lower surfaces of the first trough forming parts to illuminate such surfaces, an axially disposed lamp socket carried by the inner member of the bulb receiving trough, and a pendant lamp bulb carried by the axial socket for direct lighting, the lower surface of said trough forming part reflecting light from the latter mentioned lamp bulb.

LEROY C. DOANE.